United States Patent
Jalaldeen et al.

(10) Patent No.: US 10,338,891 B2
(45) Date of Patent: *Jul. 2, 2019

(54) MIGRATION BETWEEN MODEL ELEMENTS OF DIFFERENT TYPES IN A MODELING ENVIRONMENT

(71) Applicant: INTERNATIONAL BUSINESS MACHINES CORPORATION, Armonk, NY (US)

(72) Inventors: Ahamed Jalaldeen, Bangalore (IN); Binnoy Scaria, Kerala (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 137 days.

This patent is subject to a terminal disclaimer.

(21) Appl. No.: 15/216,915

(22) Filed: Jul. 22, 2016

(65) Prior Publication Data
US 2016/0328213 A1   Nov. 10, 2016

Related U.S. Application Data

(63) Continuation of application No. 14/681,153, filed on Apr. 8, 2015, now Pat. No. 9,442,698, which is a (Continued)

(51) Int. Cl.
*G06F 8/10* (2018.01)

(52) U.S. Cl.
CPC .................................. *G06F 8/10* (2013.01)

(58) Field of Classification Search
CPC ........................................................ G06F 8/10
See application file for complete search history.

(56) References Cited

U.S. PATENT DOCUMENTS

2007/0277151 A1   11/2007   Brunel et al.
2008/0244541 A1   10/2008   Thomson et al.
(Continued)

OTHER PUBLICATIONS

Automated Test Framework for 'UML Model Generation Tools' Characterized by Unique UML Model Generated for Constant Input Directives, Nov. 7, 2011, 5 pages, http://ip.com/IPCOM/000212332.
(Continued)

*Primary Examiner* — Wei Y Zhen
*Assistant Examiner* — Amir Soltanzadeh
(74) *Attorney, Agent, or Firm* — Michael O'Keefe; Matthew M. Hulihan; Heslin Rothenberg Farley & Mesiti PC

(57) ABSTRACT

Migration between model elements of different model element types in a model provided within a modeling environment is described herein. A model element of a first model element type is identified to be migrated to a model element of a second model element type. The model element of the first model element type is then migrated to the model element of the second model element type. The migrating migrates one or more relationships that exist between the model element of the first model element type and a related model element to one or more relationships between the model element of the second model element type and the related model element. The migrating also preserves properties of diagrammatic representations of the model element being migrated in diagrams of the model.

16 Claims, 12 Drawing Sheets

Related U.S. Application Data continuation of application No. 13/732,723, filed on Jan. 2, 2013, now Pat. No. 9,098,215.

(56) References Cited

U.S. PATENT DOCUMENTS

| | | | |
|---|---|---|---|
| 2008/0263510 | A1 | 10/2008 | Nerome et al. |
| 2009/0093901 | A1 | 4/2009 | Awile et al. |
| 2010/0023922 | A1 | 1/2010 | Limburn et al. |
| 2010/0262949 | A1* | 10/2010 | Jacobsen ............ G06F 8/10 717/105 |
| 2011/0131547 | A1 | 6/2011 | Elaasar |
| 2011/0191748 | A1 | 8/2011 | Kannan et al. |
| 2012/0011097 | A1 | 1/2012 | Matsumura et al. |
| 2012/0042299 | A1 | 2/2012 | Perrin et al. |
| 2012/0159427 | A1 | 6/2012 | Oara et al. |
| 2012/0192143 | A1 | 7/2012 | Elaasar |
| 2012/0192144 | A1 | 7/2012 | Jalaldeen et al. |

OTHER PUBLICATIONS

Siveroni, Igor, et al., Property Specification and Static Verification of UML Models, The Third International Conference of Availability, Reliability and Security, 2008 (no further date information available), pp. 96-103, http://ieeexplore.ieee.org/xpl/login.jsp?tp=&arnumber=4529326&url=http%3A%2F%2Fieeexplore.ieee.org%2Fxpls%Fabs_all.jsp%3Farnumber%3D4529326.

Thakare, Bhushan S. et al., New Approach for Model Merging and Transformation, 2012 International Conference on Computer Communication and Informatics, Jan. 10-12, 2012 5 pages, http://ieeexplore.ieee.org/xpl/articleDetails.jsp?tp=&arnumber=6158834&contentType=Conference+Publications&sortType%3Ddesc_p_Publication_Year%26queryText%3DUML+Types.

IBM Rational Rhapsody Architect for Software, Visualizing Software Development, Rational Software, Dec. 2009, 4 pages.

No Magic, Magic Draw, http://www.nomagic.com/products/magicdraw.html, Aug. 1, 2012, 4 pages.

OMG Systems Modeling Language, The Official OMG SysML Site, Jul. 31, 2012, http://www.omgsysml.org/, 10 pages.

OMG, UML/SysML Tool Vendor Model Interchange Test Case Results Now Available, Dec. 1, 2011, http://www.omg.org/news/releases/pr2011/12-01-11.htm/, 2 pages.

Model Interchange Wiki, Jan. 30, 2012, http://www.omgwiki.org/model-interchange/doku.php, 5 pages.

Thomas Haley et al., Teams and SysML: Proof of Concept Ststus, Office of Naval Research Teams, Torpedo Enterprise, Advanced Modeling & Simulation, Apr. 17, 2007, 43 pages.

Eclipse, Eclipse Community Forums, Transform to SysML Blocks http://www.eclipse.org/forums/index.php/m/881995/#msg_881995, May 2012, 12 pages.

Jonathan Lasalle et al., Development of an Automated MBT ToolChain From UML/SysML Models, Innovations in Systems and Software Engineering Manuscript, Dec. 4, 2012, 9 pages.

Nicholasbelloir, From SysML to UML, Does SysML Improve Software Components Design in a System Engineering Project, Liuppa, Feb. 14, 2009, 57 pages.

Sanford Friedenthal, Model Interchange Working Group (MIWG) Update Overview, Status, Lessons Learned, and Plans, Mar. 23, 2011, 53 pages, http:www.omgwiki.org/model-interchange.

Conrad Bock, SysML and UML 2 Support for Activity Modeling, U.S. Institute of Standards and Technology, Systems Engineering, vol. 9, No. 2, Nov. 4, 2005, pp. 160-186.

Dave Richards et al., Testing Solutions through SysML/UMl, Nov. 7, 2012, 20 pages.

Using UML or SysML with the Teamcenter Interface, Nov. 7, 2012, 5 pages.

Visual Paradigm for UML 10.0 Modeler Edition, Nov. 7, 2012, 2 pages, http://www.visual-paradigm.com/product/vpuml/editions/modeler.jsp.

Method and Apparatus for Migrating UML Models into SysML Models, Dec. 11, 2012, 5 pages.

Office Action in U.S. Appl. No. 13/732,723, dated Jul. 25, 2014, 38 pages.

Final Office Action in U.S. Appl. No. 13/732,723, dated Jan. 14, 2015, 35 pages.

Notice of Allowance in U.S. Appl. No. 13/732,723, dated Mar. 26, 2015, 5 pages.

Notice of Allowance in U.S. Appl. No. 14/681,153, dated May 27, 2016, 18 pages.

Office Action in U.S. Appl. No. 14/681,153, dated Jul. 2, 2015, 53 pages.

Final Office Action in U.S. Appl. No. 14/681,153, dated Jan. 12, 2016, 58 pages.

Rational Rhapsody Architect for Software, http://www-142.ibm.com/software/products/us/en/ratirhaparchforsoft, Aug. 1, 2012, 2 pages.

* cited by examiner

300

| | RELATIONSHIP TYPE | MODEL ELEMENT TYPE (FROM) | MODEL ELEMENT TYPE (TO) |
|---|---|---|---|
| 302 | 304 | 306 | |
| 308a | GENERALIZATION | INTERFACE | INTERFACE |
| 308b | REALIZATION | INTERFACE | CLASS |
| 308c | OWNED | INTERFACE | OPERATION |
| 308d | OWNED | CLASS | PORT |
| 308e | OWNED | ACTIVITY | STRUCTUREDACTIVITYMODE |
| 308f | OWNED | STRUCTUREDACTIVITYMODE | CALLBEHAVIORACTION |

FIG. 3

MIGRATION BETWEEN MODEL ELEMENTS OF DIFFERENT TYPES IN A MODELING ENVIRONMENT

BACKGROUND

Modeling tools provide a means by which various concepts can be represented in software. A modeling tool facilitates specification of concept characteristics as well as the relationships between those concepts. Many modeling tools are based on the Unified Modeling Language (UML) which includes a set of standard modeling concepts like class, interface, package, component, and many others that are part of a standard metamodel, also known as the "UML metamodel".

A user creates model elements in a modeling environment to model the various concepts. Model elements are instantiated and assigned a type from one of possibly many available model element types. The model element type of a model element can invoke certain constraints on how that model element is used in the model, such as constraints on the types of relationships in which the model element may be involved, and the types of other model elements to which the model element may be related.

Occasionally, it is necessary to change the type of a model element to a different model element type. However, existing modeling environments do not provide an effective approach through which these changes may be accomplished.

BRIEF SUMMARY

The shortcomings of the prior art are overcome and additional advantages are provided through the provision of a method that includes, for instance, obtaining an indication of a model element of a first model element type which is to be migrated to a model element of a second model element type; and automatically migrating, by a processor, the model element of the first model element type to the model element of the second model element type, wherein the automatically migrating migrates a relationship between the model element of the first model element type and a related model element to a relationship between the model element of the second model element type and the related model element.

Additionally, a computer system is provided which includes a memory and a processor in communications with the memory. The computer system is configured to perform, for instance: obtaining an indication of a model element of a first model element type which is to be migrated to a model element of a second model element type; and automatically migrating the model element of the first model element type to the model element of the second model element type, wherein the automatically migrating migrates a relationship between the model element of the first model element type and a related model element to a relationship between the model element of the second model element type and the related model element.

Further, a computer program product is provided which includes a computer-readable storage medium readable by a processor and storing instructions for execution by the processor to perform a method that includes, for instance: obtaining an indication of a model element of a first model element type which is to be migrated to a model element of a second model element type; and automatically migrating the model element of the first model element type to the model element of the second model element type, wherein the automatically migrating migrates a relationship between the model element of the first model element type and a related model element to a relationship between the model element of the second model element type and the related model element.

Additional features and advantages are realized through the concepts of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 3 depicts one example of a model element type relationship table, in accordance with one or more aspects of the present invention;

DETAILED DESCRIPTION

Figure 1:
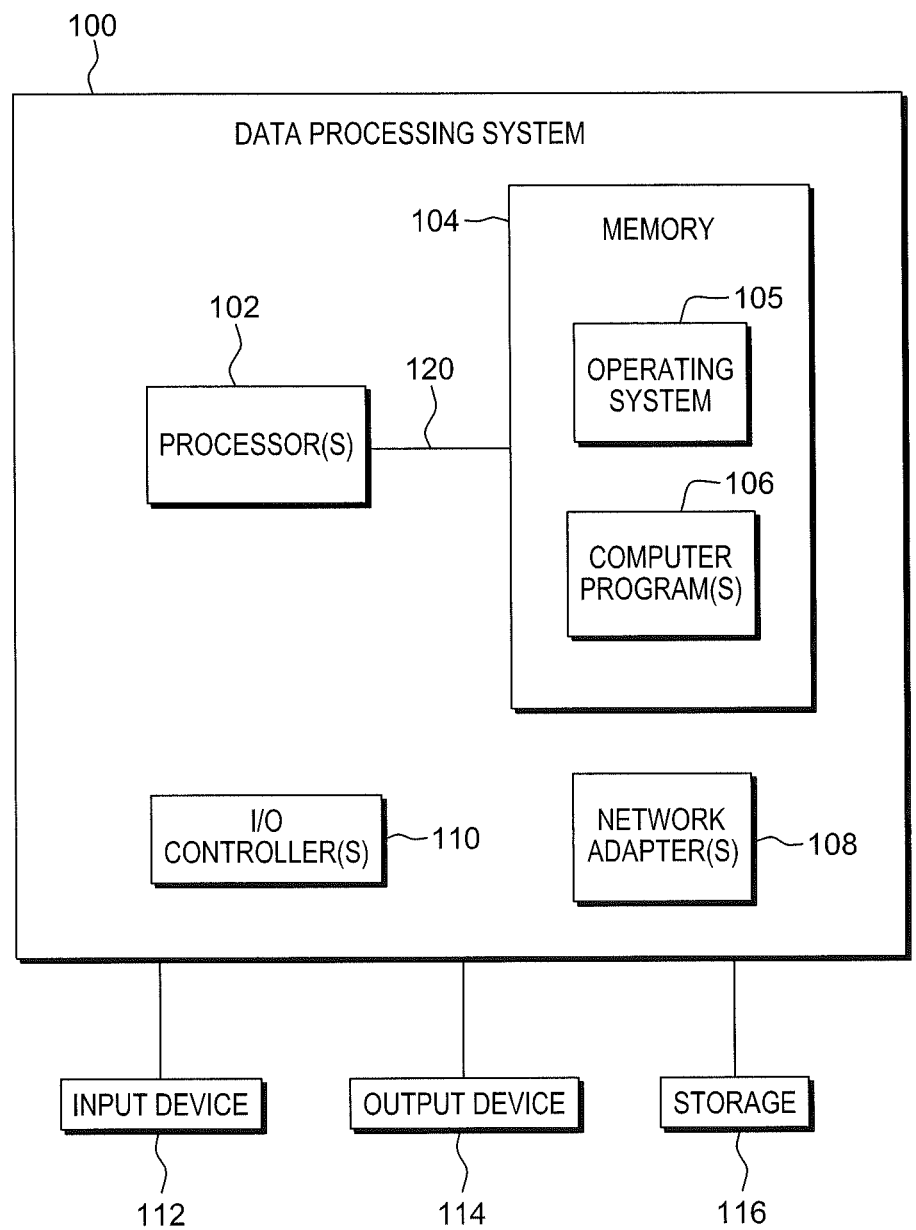
FIG. 1 depicts one example of a data processing system to incorporate and use one or more aspects of the present invention.

Aspects of the present invention are directed to automatic migration of a model element of one type to a model element of another type in a modeling environment. Migration, in one example, replaces a model element of a first model element type with a model element of a different model element type, or, in another example, changes the model element itself to change its type from one model element type to another model element type. The model element being migrated is referred to herein as a source model element, and the model element to which the source model element is migrated is referred to herein as a target model element.

In one example, the source model element, of a first model element type, is replaced with a newly instantiated target model element of a second model element type. As part of this replacement, properties of diagrammatic representations of the model element of the first model element type in diagrams of the modeling environment are preserved in diagrammatic representations of the model element of the second model element type, and these diagrammatic representations of the model element of the second model element type replace the diagrammatic representations of the model element of the first model element type in the diagrams. Additionally, relationships between the model element of the first model element type and related model elements in the modeling environment are migrated to relationships between the model element of the second model element type and those related model elements. This migration occurs even when the type of relationship between the model element of the first model element type and a related element is invalid as between the model element of the second model element type and that related model element. In that case, a replacement relationship type is identified and applied as the type of relationship between the model element of the second model element type and the related model element.

Alternatively, migration of the model element of the first model element type to the model element of the second model element type occurs without replacing the model element of the first model element type. Instead, the model element of the first model element type is modified to become the model element of the second model element type. In this case, the migration occurs without instantiating a new model element with the second model element type. The model element of the first model element type is modified such that its type changes to the second model element type, while the relationships that existed between the model element (when it was the model element of the first model element type) and related model elements are migrated to appropriate relationships types as between the model element (after migrating into the model element of the second model element type) and the related model elements. Also in this case, the diagrammatic representation(s) of the model element of the first model element type change in the diagrams (if necessary) to reflect necessary relationship changes as a result of the migration, and properties of the diagrammatic representations are therefore preserved as part of the migration.

FIG. 1 depicts one example of a data processing system to incorporate and use one or more aspects of the present invention. Data processing system 100 may be based on, for instance, the xSeries® or pSeries® architectures offered by International Business Machines Corporation, Armonk, N.Y. (xSeries® and pSeries® are registered trademarks of International Business Machines Corporation, Armonk, N.Y.), or on Intel Corporation's x86 architecture.

Data processing system 100 is suitable for storing and/or executing program code and includes at least one processor 102 coupled directly or indirectly to memory 104 through, e.g., a system bus 120. In operation, processor(s) 102 obtain from memory 104 one or more instructions for execution by the processors. Memory 104 may include local memory employed during actual execution of the program code, bulk storage, and cache memories which provide temporary storage of at least some program code in order to reduce the number of times code must be retrieved from bulk storage during program code execution. A non-limiting list of examples of memory 104 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 104 includes an operating system 105 and one or more computer programs 106, such as one or more modeling environments. An example modeling environment is the Service-Oriented Modeling and Architecture Modeling Environment (SOMA-ME), an extension of the Rational® Software Architect and Rational® Software Modeler tools offered by International Business Machines Corporation (Rational® is a registered trademark of International Business Machines Corporation, Armonk, N.Y.).

Input/Output (I/O) devices 112, 114 (including but not limited to keyboards, displays, pointing devices, etc.) may be coupled to the system either directly or through I/O controllers 110.

Network adapters 108 may also be coupled to the system to enable the data processing system to become coupled to other data processing systems or remote printers or storage devices through intervening private or public networks. Modems, cable modem and Ethernet cards are just a few of the currently available types of network adapters 108.

Data processing system 100 may be coupled to storage 116 (e.g., a non-volatile storage area, such as magnetic disk drives, optical disk drives, a tape drive, etc.), having one or more databases. Storage 116 may include an internal storage device or an attached or network accessible storage. Computer programs in storage 116 may be loaded into memory 104 and executed by a processor 102 in a manner known in the art.

The data processing system 100 may include fewer components than illustrated, additional components not illustrated herein, or some combination of the components illustrated and additional components. Data processing system 100 may include any computing device known in the art, such as a mainframe, server, personal computer, workstation, laptop, handheld computer, telephony device, network appliance, virtualization device, storage controller, etc.

Aspects of the invention are presented initially using examples drawn to the Unified Modeling Language. However, UML is used as only one specific example of the kinds of modeling languages to which aspects of the present invention apply. Those having ordinary skill in the art will recognize that features presented herein with reference to UML are more broadly applicable to other forms of models and modeling environments (involving other modeling languages for instance). UML has been used for purposes of explanation and should not be considered limiting on the invention in any way.

When modeling in a modeling language using a tool such as Rational® Software Architect or Rational® Software Manager (both UML-based modeling tools offered by International Business Machines Corporation), a user decides what model element type to use for representing a particular concept. For instance, when modeling a service in a service-oriented architecture based solution, the user may use an "Interface" model element type of UML and, optionally, apply a further stereotype to the interface, if desired. Once the concept is modeled as a model element with the appropriate model element type, the user can use the model element in a variety of modeling environment modules/applications, such as by adding the element to a diagram, and establishing relationships between that model element and other model elements in the diagram. Additionally, relationships can be created programmatically between model elements using a menu option, for instance. Thus, model elements are sometimes not independent of each other, but rather are tied to other model elements by relationships formed between them.

There are common scenarios in which, after using a particular model element type for a model element, the type of the model element is to be changed. This may be the case where many different model element types could be used to model the same or similar concept. For instance, there may be many different model element types for a process element, and it may be desirable to change the model element type from one type of process to another type of process.

The relationships and diagrammatic representations of the model element to be changed introduce complexities that conventional modeling tools do not properly handle. If the model element of the first model element type is merely removed from the model, the diagrams having that model element and the relationships in which that model element participates will be affected in that the relationships that the model element of the first model element type has with related model elements, as well as the properties of the diagrammatic representations of that model element of the first model element type, are lost. Currently, modeling environments, such as UML-based modeling environments, do not provide a facility for automatically making this type of change/migration of a model element type (such as a UML meta-class) of an existing model element.

Figure 2A:
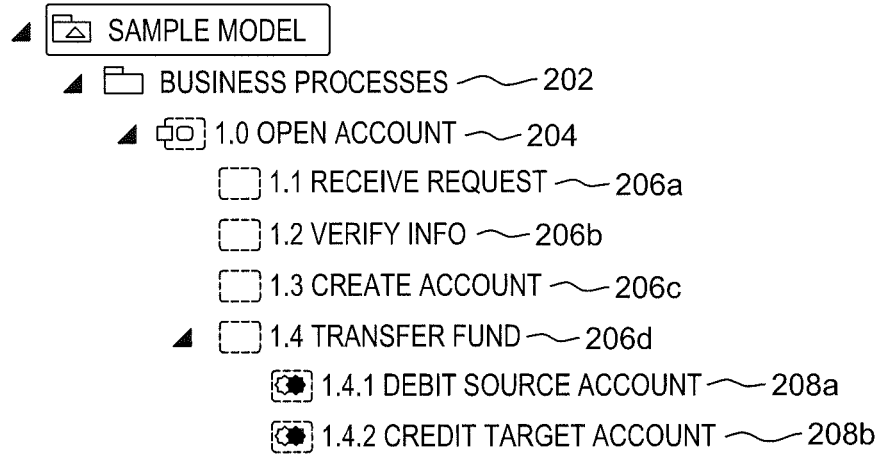
FIGS. 2A-2C depict example models illustrating relationships between model elements in a modeling environment.
Figure 2B:
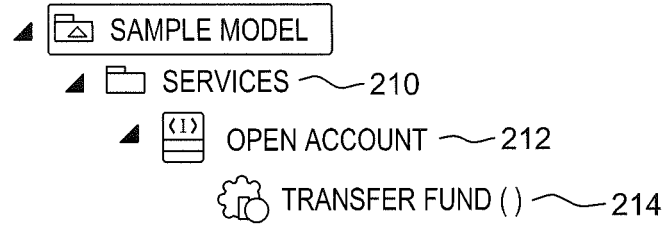
Figure 2C:
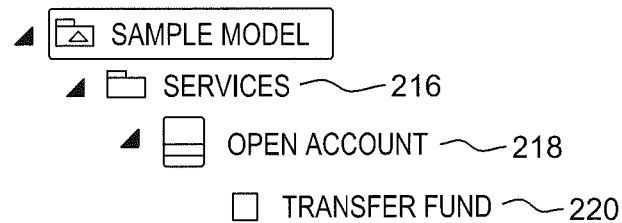

FIGS. 2A-2C depict example models illustrating relationships between model elements within a modeling environment, to illustrate some example scenarios. The example models arrange model elements in a tree structure to depict relationships between those elements. Each child and parent of a tree structure is considered a model element, with some model elements having different model element types than others, depending on the position in the hierarchy.

FIG. 2A presents a UML representation of a business process model. The subject model is entitled Sample Model, and includes a 'package' called "Business Processes" 202. The business processes 'package' contains one or more business processes. In this example, a single business process 204, entitled "1.0 Open Account" is presented within the package 202.

Business process concepts can be broken down, in this example, into (i) a process, (ii) sub-process(es) of that process, and (iii) individual tasks that make up the sub-process(es). When modeling these business process concepts, the Activity, StructuredActivityNode, and CallBehaviorAction model element types in the UML meta-model are used to represent the process, sub-process, and task model elements, respectively.

The first model element type is Activity, used in this case as the UML type for a UML element representing the open account process, a process for opening a bank account. Model element Open Account 204 is of UML type Activity, and represents a parent process containing sub-processes. The second model element type is StructuredActivityNode, used in this case as the UML type for UML elements representing sub-processes model elements. Thus, Open Account 204 has four child model elements all of UML type StructuredActivityNode: "1.1 Receive Request" 206a, "1.2 Verify Info" 206b, "1.3 Create Account" 206c, and "1.4 Transfer Fund" 206d.

A third type of UML model element, a CallBehaviorAction, is used to model the leaf-level elements representing individual tasks within a sub-process. In FIG. 2A, only tasks of the Transfer Fund model element 206d are shown. Specifically, a Debit Source Account model element 208a and a Credit Target Account model element 208b, both of UML type CallBehaviorAction, are shown.

After the open account process is modeled, the user may desire for the Transfer Fund model element 206d, of type StructuredActivityNode, to be promoted to the same level as Open Account model element 204, of type Activity. This change effectively makes the Transfer Fund sub-process its own process. Transfer Fund model element 206d, might have reuse potential, for instance, that is leveraged by promoting it to the Activity UML type, making it accessible to other components of the solution. However, conventionally, there is no way to automatically promote Transfer Fund model element 206d in this fashion. This is due to potential constraints at both the model tooling level (facilities provided by the modeling tool) as well as at the UML constraint level. For instance, there might be a UML-level constraint strictly limiting a StructuredActivityNode model element to existence as a child element of an Activity or Activity Group, which would prevent the element from being created or moved under a package (Business Processes package 202, in this example). Since Transfer Fund model element 206d was created as a StructuredActivityNode, the UML-level constraint prevents the user from promoting Transfer Fund model element 206d directly under Business Processes package 202.

In this scenario, a conventional approach would have the user delete Transfer Fund model element 206d of type StructuredActivityNode and create a new model element of type Activity, under Business Processes package 202. However, child model elements 208a and 208b of element 206d are then orphaned and (may be) deleted automatically since their parent model element 206d is deleted. Additionally, the deletion of 206d will remove any representations of that model element in UML diagrams, and relationships between those representations and other graphical representations in the diagrams are also lost.

FIG. 2B depicts a UML representation of a Service Model, and more particularly a service package including Services and Service Operations, which are operations performed as part of a service. A Service is represented by the Interface UML type, and a Service Operation is represented by the Operation UML type, in this example. A sub-element of service package 210 (entitled Services) is the Open Account model element 212, of UML type Interface, having the child Transfer Fund( ) model element 214 of UML type Operation. Assume, as an example, that a user realizes during a service re-factoring exercise a need for promoting the Transfer Fund( ) Service Operation (represented by Transfer Fund( ) model element 214 of type Operation) to a Service (i.e. model element of type Interface). However, since the UML type Operation is a behavioral feature of a classifier, it cannot be created or moved under a package (i.e. model element 210). A constraint here, then, is that a user cannot move Transfer Fund( ) model element 214, of type Operation, under the Services package 210. No facility exists in the modeling environment to change the model element type from Operation to Interface.

FIG. 2C depicts another UML representation of a Service Model, this time where Class and Port model element types of a UML meta-model are used to represent a Service Specification and Service, respectively, in the UML model. Again, a services package 216 is presented, this time containing an Open Account model element 218, of UML type Class, representing the Open Account Service Specification. Open Account model element 218 has a child element, Transfer Fund model element 220, of UML type Port. During service re-factoring, the user may realize a need to promote Transfer Fund model element 220 (of type Port) as a Service Specification (UML type Class). However, the UML type Port is a composite structure that can be created under other element types, such as Class, but cannot be created directly under a package. Thus, Transfer Fund model element 220 (being of type Port) cannot simply be promoted to directly beneath services package 216 as type Port. No facility exists in the modeling environment to change the model element type from Port to Class.

A user facing the above scenarios could manually remove the old model element of a model element type and create a new model element of another model element type in its place. However, this can be problematic because, for instance, of the loss of relationships that existed between the old model element and related model elements. Removal of the old model element will result in the loss of the model element in the diagrams.

Even if the user could simply change the type of the model element without deleting the element and creating a new one, there is conventionally no way to ensure that the relationships between the model element and related model elements will be preserved post migration. Some types of relationships between two model element types are valid, and some types of relationships between two model element types are not valid. When the type of one model element of a relationship changes, the relationship type of the relationship between that element and a related model element may become invalid. As an example, a UML Interface type of model element can be realized by a UML Class type of model element (i.e. there is a "Realization" type relationship from an Interface type to a Class type), but that Realization type relationship may not exist (i.e. be invalid) if the model element type of one or both of those model elements changes.

Furthermore, there is no facility for restoring existing relationships—those that existed between the source model element and related model elements—that were created programmatically in the modeling environment. Typically, menu options and other tooling facilities are used to create these relationships programmatically, in order to relate the source model element to other model elements. They are used to create, for example, dependencies of one model element on another model element. By way of a specific example, the user may place two model elements into a diagram and create a relationship by drawing a connection between them indicating a relationship like dependency. The diagrams with the model element of the first model element type will be affected if that model element is simply deleted; i.e. the model element will go missing, connectivity of that model element to other model elements in the diagram will be broken, etc.

Thus, the user is left to manually recreate (for the model element of the second model element type) the above relationships and properties, which is an inefficient, time-consuming, and error-prone activity.

What is needed, and what is provided in accordance with aspects of the present invention, are facilities for migrating a model element of a first model element type to a model element of a second model element type in an efficient, reliable, and seamless manner. The model element to be migrated is the source model element, which is of the source model element type, and the model element to which the source model element is to be migrated is the target model element, which is of the target model element type.

Aspects of the present invention are facilitated through the use of a model element type relationship table, an example of which is presented in FIG. 3. The table indicates, in this example, valid relationship types as between different model element types. This is useful for specifying the types of relationships that are allowed to exist in the model between particular model elements. In this example, an entry is provided for each valid relationship that can exist between two particular model element types, the entry specifying the relationship type 302 and a model element type pair which includes a "from" model element 304 and "to" model element 306. "From" and "to" denote a directional property of the relationship between the two model elements. As is known in the art, relationships may be directional as between two model elements, where the relationship extends in one direction but not necessarily the other. For instance: "A is the uncle of B" is true, but only in one direction; "B is the uncle of A" is certainly not true. In that case, a counterpart relationship, "B is the nephew of A", would be true, and may be recorded as a separate relationship in the table. Alternatively, some relationships are bidirectional ("B and A are cousins") and may be represented as one relationship in the table, or as two separate relationships.

Table 300 includes six entries indicating six valid types of relationships 308*a*-308*f*. In some embodiments, there may be many more entries for any number of relationships. Valid relationship 308*b*, for instance, indicates that a Realization relationship type may exist from an Interface model element to a Class model element. Table 300 indicates only all of the valid relationships (in this example), so the Realization type relationship is not valid from, say, a Class model element to an Interface model element, because such a relationship is absent from table 300. Many other valid relationships are possible as between model element types, and table 300 is presented as only an example.

Table 300 may alternatively or additionally indicate only the invalid relationships as between model element types, or may include both invalid and valid relationships, providing a separate indication as to whether the entry represents a valid or invalid type of relationship. Additionally, those having ordinary skill in the art will recognize that table 300 is just one example of a data structure for indicating valid relationships between model element types. Many other approaches may be taken for a system to identify such valid relationships.

In one example, table 300 is created or specified by a user or administrator of the modeling environment. The table may be specified in a configuration file opened/used by the program, and/or may be specified dynamically within the modeling environment program itself using a module thereof, for instance.

Model element type relationship table 300 is useful when migrating a model element from one model element type to another model element type. The source model element may be related to other model elements, and the relationships between the source model element and related model elements will each have a particular type and direction. When migrating the source model element to the target model element, and in accordance with an aspect of the present invention, these relationships will be migrated as well. Take an example where an Open Account service is initially modeled as a UML Interface but it is desired to instead model the Open Account service as a UML Class. The Interface type model element is in relationship(s) with related elements, and those relationships are of particular types. But, since the model element migrating from a source type (Interface) to a target type (Class), the relationship type of the relationship being migrated may not be valid as between the target model element type (Class) and the model element type of the related model element.

Figure 4:
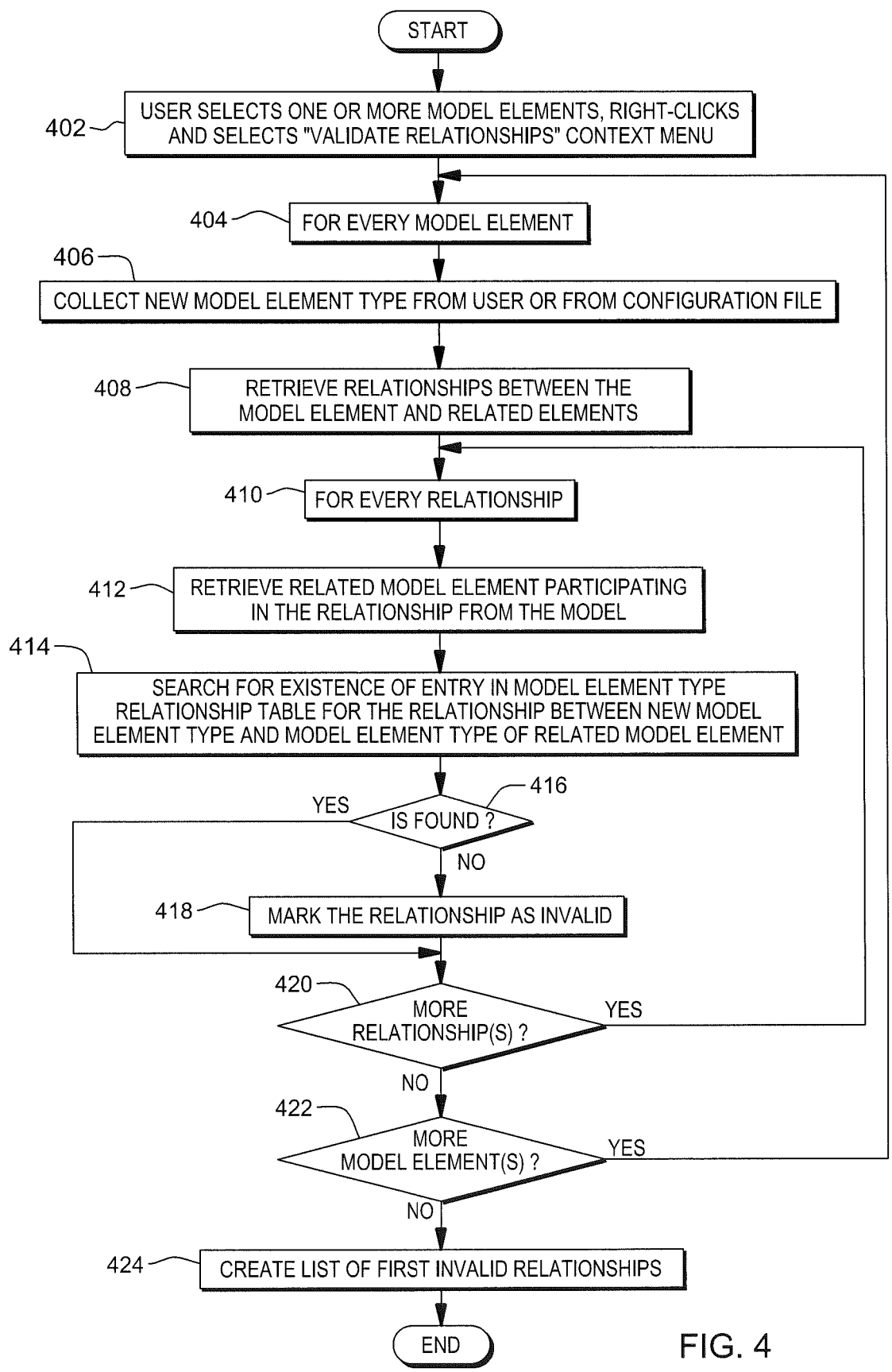
FIG. 4 depicts one example of a process for checking validity of relationship types between a model element of a second model element type and model elements related to a model element of a first model element type, in accordance with one or more aspects of the present invention.

According to an aspect of the present invention, a model element relationship type table (e.g. FIG. 3) is checked to determine whether the type of relationship being migrated from the model element of a model element type to a target model element type is valid, or whether, instead, the type of relationship must be replaced. FIG. 4 depicts one example of a process for checking validity of relationship types between a model element of a second model element type (i.e. the target model element) and model elements related to a model element of a first model element type (i.e. the source model element), in accordance with one or more aspects of the present invention.

The process begins with a user selecting one or more source model elements which are to be migrated, right clicking on the selection, and selecting "Validate Relationships" presented as a context menu (402). In one example, the user selects only one model element, though multiple model elements may be selected to process in batch, for convenience. This invokes a sub-process that repeats for each selected source model element (404). First, the process collects the new model element type (406). This is the model element type (e.g. UML type) of the target model element to which the source model element (of the first model element type) being processed (in this iteration) will be migrated.

Next, the process retrieves relationships that exist between the source model element (of the first model element type) and related model elements with which the source model element is in a relationship (408). The source model element may be part of one or more relationships with one or more model elements that are related, by way of the relationship, to the source model element. A sub-process repeats for each such relationship (410). First, the process retrieves from the model the related model element participating in that particular relationship (412) in order to determine the model element type (e.g. UML type) of related model element. The process then uses the collected new model element type (i.e. the second model element type, which is of the target model element) to search for an entry in a relationship table (e.g. FIG. 3) that indicates whether the relationship type of the relationship (between the source model element and the related model element) is also valid as between the new (second) model element type and the model element type of the related model element (414). In the example of FIG. 3, where valid relationship types are listed, the search identifies whether an entry is found (416), which indicates the relationship type as between the second model element type (of the target model element) and the model element type of the related model element (related to the source model element of the first model element type) is valid. If such an entry is found, then that means that the type of the relationship, which was valid as between the first model element type (of the first model element) and the related model element's model element type, is also valid as between the second model element type (of the target model element) and the related model element's model element type, and the relationship does not require replacement. However, if the entry is not found, then the process marks that the relationship is invalid (418) because that relationship type is not valid as between the second model element type and the model element type of the related model element. In one example, this indication of invalidity is provided in a temporary data structure or in a data file.

The process then determines whether there are more relationship(s) (i.e. between the first model element type of the source model element that is the subject of this iteration of sub-process (410) and model element type(s) of any related elements) to process (420). If so, the process returns to (412) and repeats for the next relationship. If all relationships between the source model element and related model elements have been processed, then the process determines whether there are any more selected model elements for which their relationships are to be processed (422). If so, the process returns to (404) to begin processing the next source model element of a first model element type. Otherwise, the process creates a list of the relationships that were marked invalid (424), for instance dumps, writes, outputs, etc. a list of the invalid relationships and saves the list to be used in a process described next with reference to FIG. 5.

For invalid relationships identified by the process of FIG. 4, a process is provided for selecting replacement relationship types for the invalid relationships types, in accordance with one or more aspects of the present invention. An example of such a process is presented in FIG. 5.

Initially, the user selects, e.g. by right-clicking on, a model, such as a UML model, and selects a "Find Valid Relationships" context menu (502). The model contains the source model element(s) (of one or more first model element types) being migrated to target model elements (of one or more second model element types).

The process then enters a sub-process that repeats for each invalid relationship (504). In one example, the process uses a list of invalid relationships (e.g. the list produced at (424) of FIG. 4). First, the process retrieves the "from" model element type and the "to" model element type of the invalid relationship from the model (506). As described above, relationships may be directional. In the relationship between the source model element (of the first model element type) being migrated and the related model element, one element is the "from" model element and the other is the "to" model element. The related model element, after migrating the relationship to a relationship as between the target model element (of the second model element type) and the related model element, will not change—that is, if the related model element was the "from" model element in the old relationship, it will remain the "from" model element in the migrated relationship, and if the related model element was the "to" model element in the old relationship, it will remain the "to" model element in the migrated relationship. Accordingly, the target model element (of the second model element type) will be either the "from" model element or the "to" model element in the migrated relationship, whichever the source model element was in the relationship. After retrieving the "from" model element type and the "to" model element type (one of which will be the new (second) model element type and the other of which will be the related model element's model element type), the process searches for an entry in the model element relationship table (FIG. 3) having the corresponding "from" and "to" model element types (508).

Next, the process determines whether a matching entry was found (510). If not found (in this example), then this indicates that the relationship is invalid as between the second model element type (of the target model element) and the model element type of the related model element. The process logs the relationship as being unresolved (514). If, however, a matching entry is found, then this indicates that a valid relationship type does exist between the second model element type and the related element's model element type and in the proper direction. The process captures this relationship type for use in the relationship when migrated to the target model element (of the second model element type) and the related model element (512).

It is then determined whether more invalid relationship(s) are to be processed (516), and if so, the process returns to (504) to repeat the sub-process for another relationship. Otherwise, the process continues by optionally enabling the user to make changes (518) to any unresolved relationships identified above (i.e. at 514). For instance, if the user incorrectly specified a new (i.e. second) model element type for a migration to be performed, the user may be permitted to re-specify a different model element type in order for a relationship type to be resolved.

The process then creates/builds a list of the relationships for migration between the source model element (of the first model element type) and the target model element (of the second model element type) (520). For cases where a relationship between the source model element of the first model element type and the model element type of a related model element is valid as between the target model element of the second model element type and the related model element, then that relationship can be added to the list of relationships (520) without further modification. For cases where a relationship between the source model element of the first model element type and the model element type of a related model element is invalid as between the target model element of the second model element type and the model element type of the related model element (i.e. no entry is found with that relationship type between the new model element type and the related model element's model element type), then the relationship is placed in the list of relationships for migration (520) but modified so that the relationship type for that relationship is the relationship type captured at (512) to replace the invalid relationship type.

By way of example, assume that a UML element of type Interface is being migrated to a UML element of type Class. Further assume that a Generalization relationship exists between the Interface-type UML element and another (related) UML element which is also of the UML type Interface, and that the relationship is directional, "from" the related UML element "to" the source UML model element being migrated. The source UML element, then, is the one being migrated, and is an Interface type UML element. The target UML element is (or will be after the migration) a Class type UML element, meaning the new UML type is Class. Before the migration, a relationship exists from the related UML element to the source UML element. The relationship type is indicated by 308a of FIG. 3; it is of type Generalization, from an Interface type model element (the related model element) to an Interface type model element (the source model element). After processing this relationship as part of the process of FIG. 4, this relationship will be marked invalid for migration purposes, because that relationship type (Generalization) is not a valid relationship type between the target UML element type (Class) and the related UML element (Interface). That is, there is no entry in the table of FIG. 3 that specifies a Generalization relationship from the Interface type (type of the related element) to the Class type (the new UML type).

Figure 5:
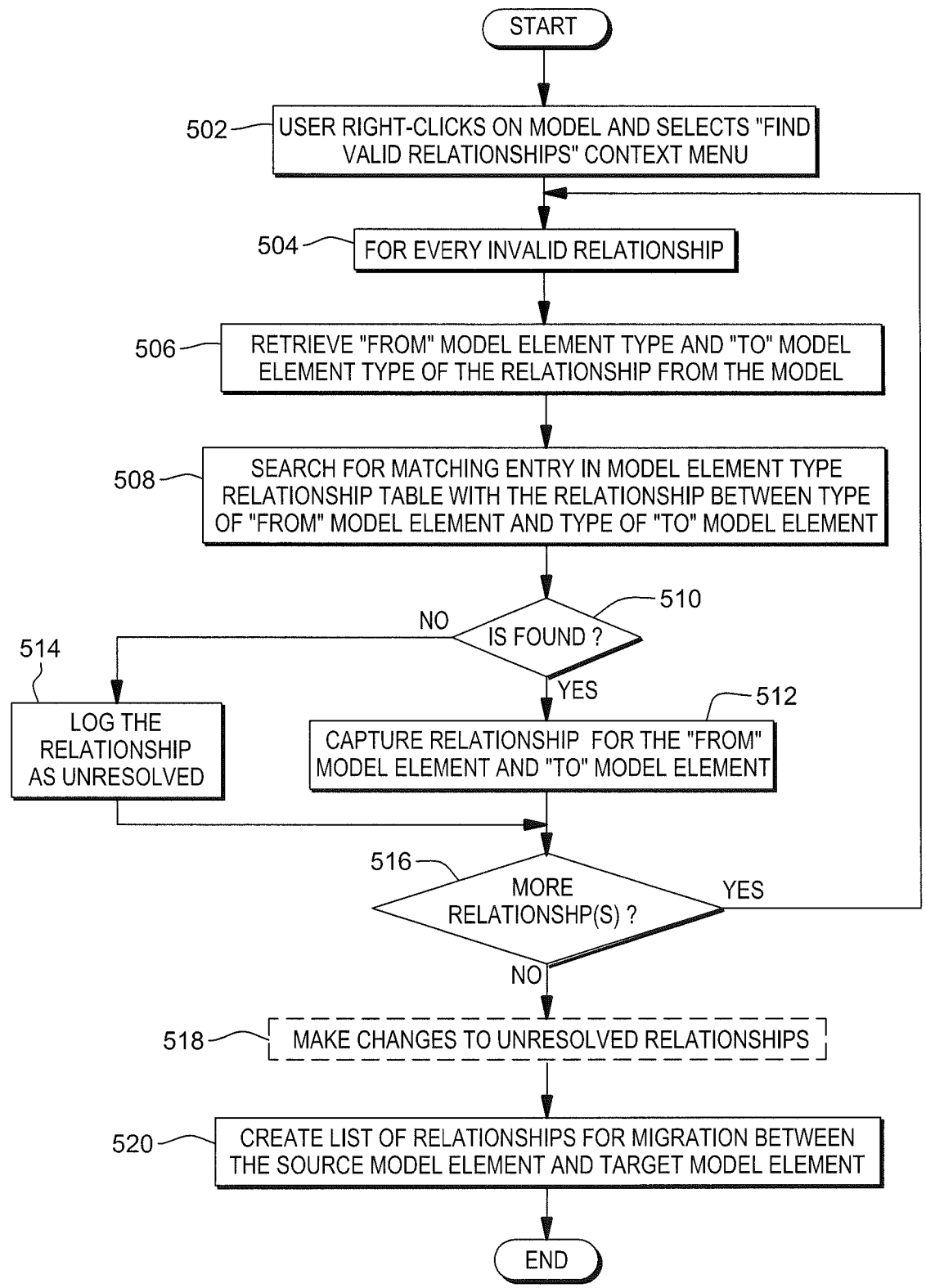
FIG. 5 depicts one example of a process for selecting replacement relationship types for invalid relationship types between a model element of a second model element type and model elements related to a model element of a first model element type, in accordance with one or more aspects of the present invention.

Continuing with the above example, the process of FIG. 5 will be used to select a relationship type to replace the Generalization relationship type, to be applied as the migrated relationship between the target UML element and the related UML element. Specifically, the process will retrieve an indication of Interface (type of the related element) as the type of the "from" element, and Class (new UML type) as the type of the "to" element, then search table 300 and find entry 308b indicating that a relationship from UML type Interface to UML type Class is valid as a Realization relationship type. Realization will be captured as the replacement relationship type, which will replace Generalization as the type of the relationship being migrated. In the list of relationships for migration between the source and target model elements, the Generalization relationship will be indicated as being of the Realization relationship type, and will therefore be valid when applied between the related model element and the target model element during the migration.

In a modeling environment, such as a UML modeling environment, model elements are created and related programmatically. Then, the model, or at least a portion thereof, is usually represented graphically in diagram(s) that show structural and/or behavioral views of model elements. Thus, in addition to the above-described relationship migration between the source model element and target model element, the potential impact of the model element type change on these diagrams is also important. If the source model element is removed from the model, any diagrammatic representation(s) of that model element in the diagrams will also be removed (or at least indicated as an invalid object). A diagram may, for instance, contain a blank space where the representation of the removed model element once was. Additionally, the relationships in the diagrams between the representation of the source model element and related model elements will be lost. While the user could manually create a replacement diagrammatic representation (of the target UML element) and recreate the diagrammatic relationships that previously existed, that process is tedious and error-prone, especially when migrating multiple, and possibly hundreds, of model elements across multiple diagrams.

Figure 6:
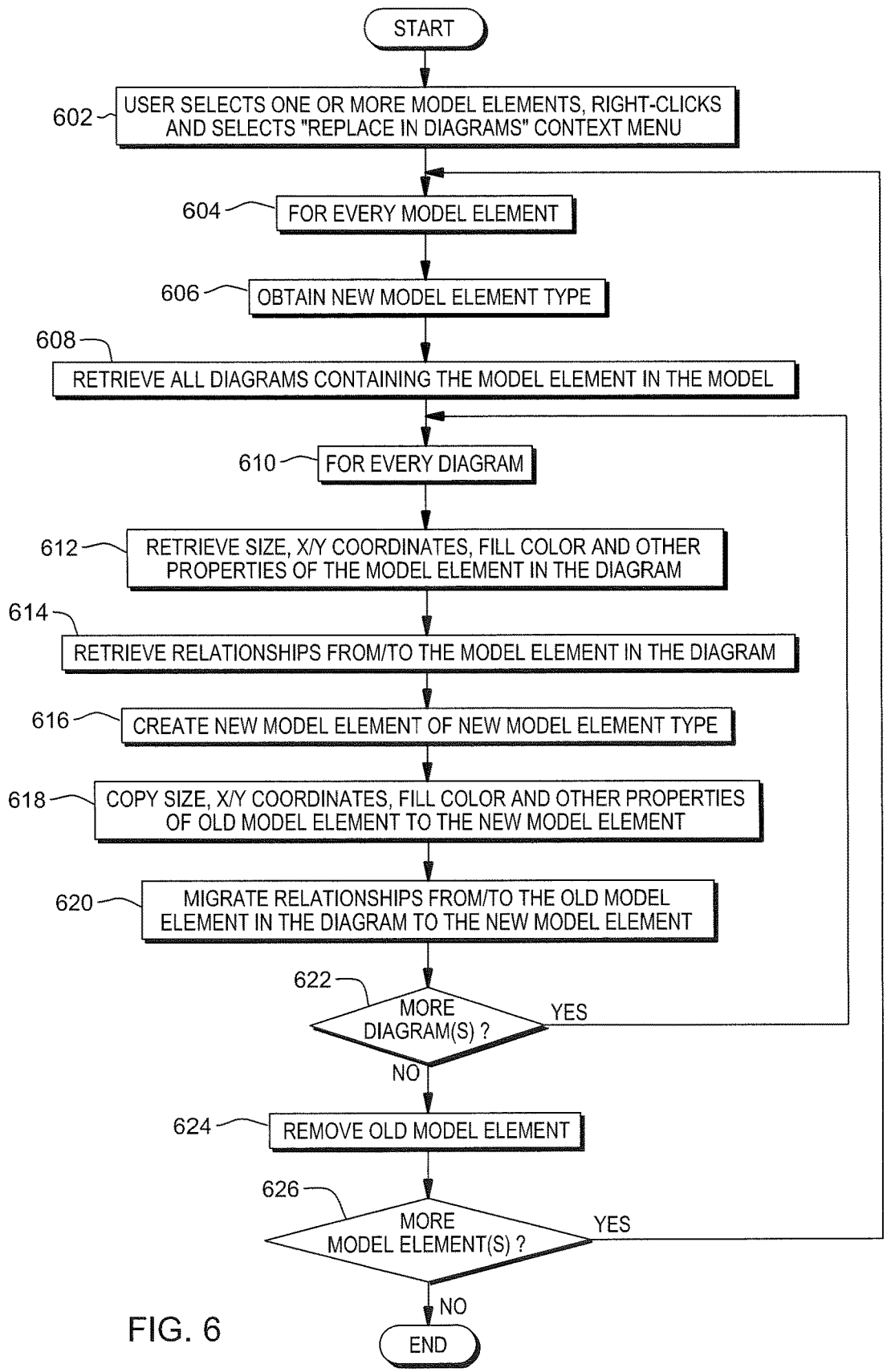
FIG. 6 depicts one example of a process for replacing a model element of a first model element type with a model element of a second model element type in diagrams of a modeling environment, in accordance with one or more aspects of the present invention.

A process is therefore provided in accordance with an aspect of the present invention for replacing a model element of a first model element type (i.e. source model element) with a model element of a second model element type (i.e. target model element) in diagram(s) of a modeling environment. An example of such process is depicted in FIG. 6. The process begins with a user selecting (e.g. by right clicking on) one or more source model elements of the model, and selecting a "Replace in Diagrams" context menu (602). The process then enters a sub-process that repeats for each source element selected (604). First, the process obtains the new model element type (606), e.g. from a configuration file or from a user, if not already obtained. The new model element type is the model element type of the target model element (i.e. is the second model element type), to which the source model element is being migrated. Next, the process retrieves all diagrams that contain the model element of the first model element type (608), i.e. contain a diagrammatic representation of that source model element. Then, for each retrieved diagram (610), the process retrieves the size, x-y coordinate location, fill color, and other properties of the diagrammatic representation of the model element in that diagram (612) using, for instance, a facility provided by the modeling environment that captures those properties. The process then retrieves the relationships from/to that diagrammatic representation of the model element of the first model element type in the diagram (614), creates/instantiates a new (target) model element of the second model element type, including a diagrammatic representation of that target model element in the diagram (616), copies the properties (size, x-y coordinate location, fill color, etc.) of the diagrammatic representation of the source model element to the diagrammatic representation of the new model element in that diagram (618), and migrates the retrieved relationships from/to the diagrammatic representation of the old model element (source model element of the first model element type) in the diagram to relationships from/to the diagrammatic representation of the new model element in the diagram (620). By the above sub-process, the relationships and the properties of the old diagrammatic representation (of the source model element) are migrated to the new diagrammatic representation (of the target model element).

The process then determines whether there are more diagrams in which the source model element is present (622), and returns to (610) if there are more diagrams. Otherwise, the process removes the old model element (624) from the diagrams, and determines whether there are additional source model elements to process (626). If so, the process returns to (604) to obtain a new model element type for a target model element to which the next source model element is to be migrated. Otherwise, the process ends.

Figure 7:
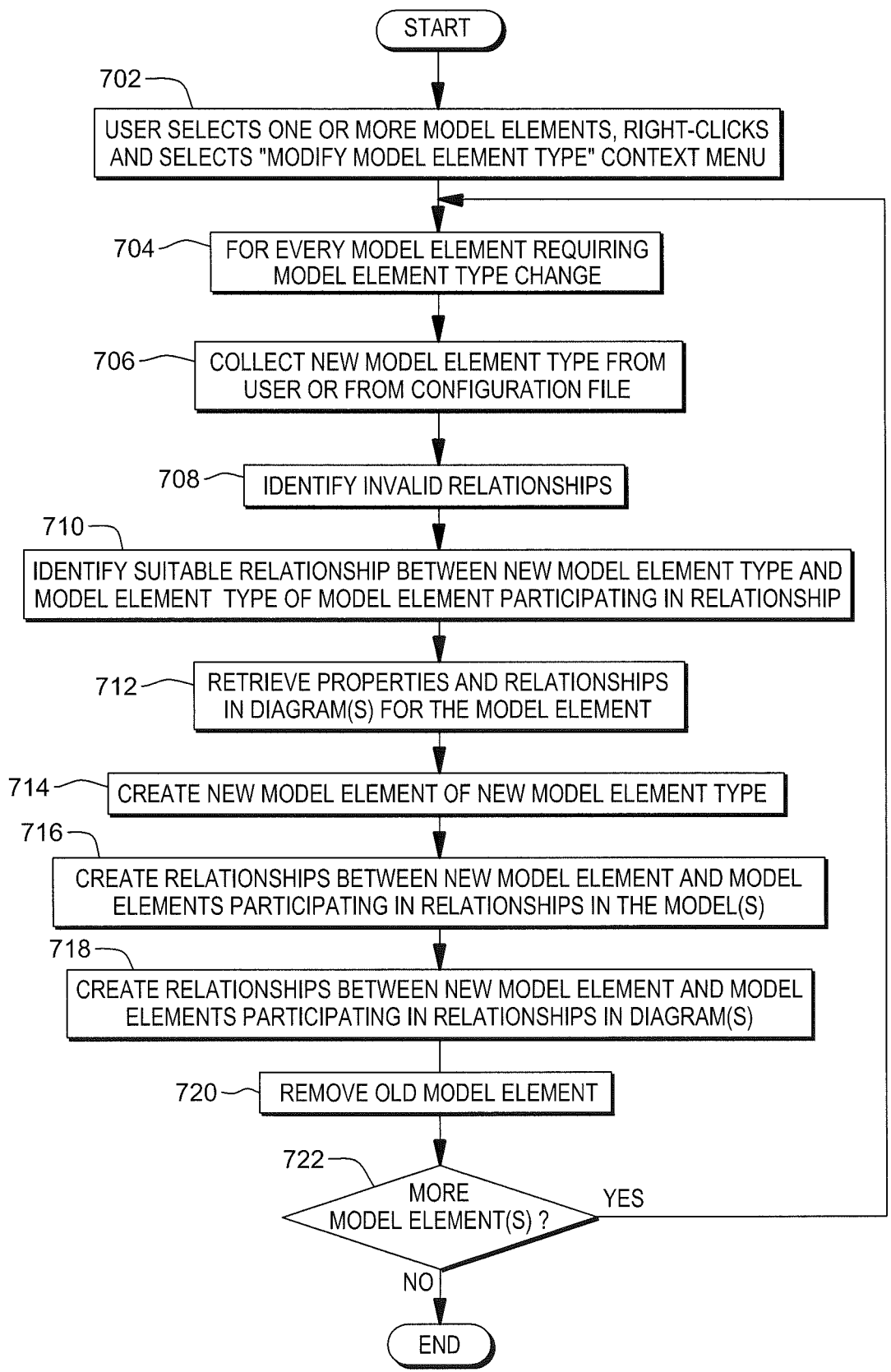
FIG. 7 depicts one example of a process for migrating a model element having a first model element type to a model element of a second model element type, in accordance with one or more aspects of the present invention.

The above example process can be used in a process for migrating a model element having a first model element type to a model element having a second model element type, in accordance with one or more aspects of the present invention. An example of such process is depicted in FIG. 7, which begins with a user selecting one or more model elements of first model element type(s), right clicking on the selection, and selecting "Modify Model Element Type", which is presented as a context menu (702). This invokes a sub-process that repeats for each selected source model element that requires a type change (704). First, the process collects the new model element type (706). This is the second model element type, which is the model element type of the target model element to which the source model element (of a first model element type and being processed in this iteration) is to be migrated. In one example, as above, this is collected from the user, for instance via a prompt that allows the user to input or indicate the new model element type, or from a configuration file which pre-specifies each new model element type to use for each particular model element or model element type to be migrated.

Next, the process identifies any relationship(s) existing between the source model element and any related model element that will be invalid as between the target model element and the related model element(s) when migrated (708). This is described above with reference to FIG. 4, and utilizes, in one example, a model element type relationship table (FIG. 3), to identify that a relationship type which was valid as between the source model element's model element type and the model element type of a related model element is not valid as between the new (target model element's) model element type and the model element type of the related model element. In one example, the relationships that exist between the source model element and related model elements are retrieved, and for each relationship, the model element type relationship table is searched to determine whether the relationship is valid (i.e. an entry having the same relationship type is found) as between the new model element type and the related element's model element type (FIG. 4 #408-420).

Once invalid relationships are identified, then suitable relationships are identified to replace those invalid relationships (710). This is described above with reference to FIG. 5, and utilizes, in one example, a model element type relationship table (FIG. 3) to identify a replacement relationship type which is valid as between the new model element type and the related model element's model element type. In one example, the model element type relationship table is searched to find a relationship type for a relationship as between the new model element type and the related element's model element type, and with the proper directionality ("from" and "to"). That relationship type is captured as the replacement relationship type for the relationship between the target model element and the related model element (FIG. 5 #504-520).

The process of FIG. 7 then retrieves the properties of diagrammatic representations of the source model element as well as any relationships between those diagrammatic representations and diagrammatic representations of the related model element in the diagrams (712), as described above with reference to FIG. 6 (e.g. #608-614). The process then instantiates (if not already instantiated) a new model element with the new model element type (714), and creates the appropriate relationships between the new model element and the related model elements (716). In other words, the relationships that existed between the source model element and the related model elements are migrated to relationships between the new model element and those related model elements, and these migrated relationships have the appropriate relationship types as between the new model element type and the model element types of the related model elements.

Finally, the process creates the proper relationships in the diagrams between the new model element in the diagrams (i.e. its diagrammatic representations) and the related model elements in the diagrams (i.e. their diagrammatic representations) (718).

At that point, the particular source model element of a first model element type being processed in that iteration of sub-process (704) has been migrated to a target model element of a second model element type, with the relationships between the source model element and model elements related to the source model element, as well as the diagrammatic relationships and properties of the source element in the diagrams, being migrated to the target model element. The process then removes the old (source) model element (720) and determines whether there are more model elements to be migrated (722). I so, the process returns to (704). Otherwise, the process ends.

The Unified Modeling Language is used in some examples above, but aspects of the present invention are applicable to other modeling environments. Additionally, in the examples above, a new model element is instantiated as the target model element to which the source model element is migrated. The relationships and other model element properties, including its diagrammatic properties, are migrated by way of a transfer, replication, copy, etc. to the instantiated target model element. However, in some embodiments, depending on the manner in which the model elements are structured in the modeling environment, software, and hardware resources used, it may not be necessary to instantiate a new model element as the target model element. In one example, the source model element of the first model element type, embodied by/in data structures of the modeling environment, is modified to effect the migration to the target model element of the second model element type. That is, the source model element migrates into the target model element, where the type of that source model element is migrated (changed) to the new model element type, the relationship types of the relationships that source model element has with other model elements are modified appropriately, to migrate the relationships to the target model element, and the diagrammatic properties/relationships themselves remain unchanged, except that, by way of the migration, they become diagrammatic properties/relationships of the target model element.

Thus, FIGS. 8-11 are provided as additional example processes according to aspects of the present invention, and are not limited to embodiments involving a particular modeling environment, such as a UML-based modeling environment, or in which a new model element is instantiated as the target model element.

Figure 8:
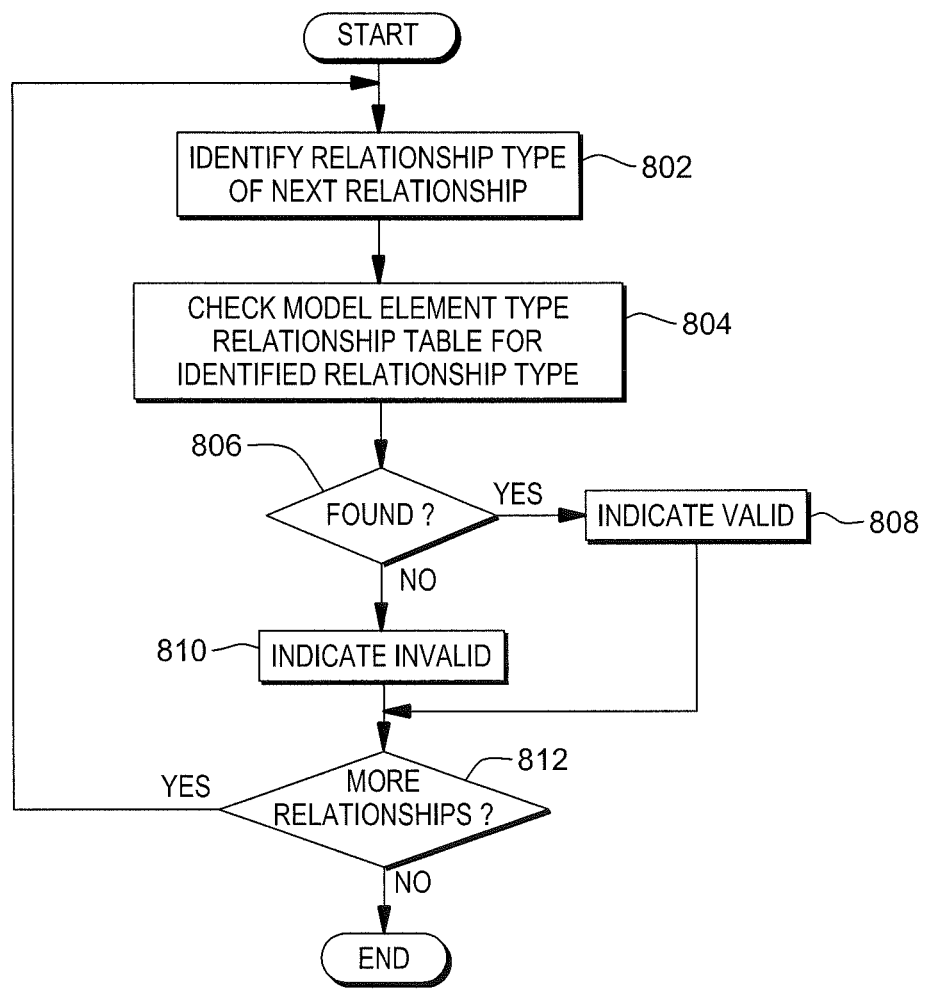
FIG. 8 depicts another example of a process for checking validity of relationship types between a model element of second model element type and model elements related to a model element of a first model element type, in accordance with one or more aspects of the present invention.

FIG. 8 depicts one example of a process for checking validity of relationship types. Specifically, for each relationship between a model element of a first model element type to be migrated and a related model element, the type of that relationship is checked for validity as it applies to a relationship between a model element of a second model element type and the related model element.

The process begins by identifying the relationship type of a next relationship (802). In this manner, the relationship type of a relationship between the model element of the first model element type and a related model element is identified. Next, a model element type relationship table is checked for the existence of that identified relationship type as between the model element of the second model element type and the related model element type (804). The checking determines whether that relationship type is valid, with the proper direction ("from"/"to"), as between the model element of the second model element type and the related model element type. In one example, the table includes entries, where the presence of an entry indicates a valid relationship. Absence of an entry indicating that relationship type, in the proper direction as between the model element of the second model element type and the related model element type indicates that a relationship with that type is invalid as between those model elements.

It is determined whether the identified relationship type is found (806), and if so, this relationship type is indicated (e.g. in data file or database table, as examples) as valid as between the model element of the second model element type and the related model element (808). Otherwise, the relationship type is indicated as invalid as between the model element of the second model element type and the related model element (810). In either case, the process continues by determining whether there are more relationships (between the model element of the first model element type and any other related model element) to process (812). If so, the process continues to (802), otherwise the process ends.

Figure 9:
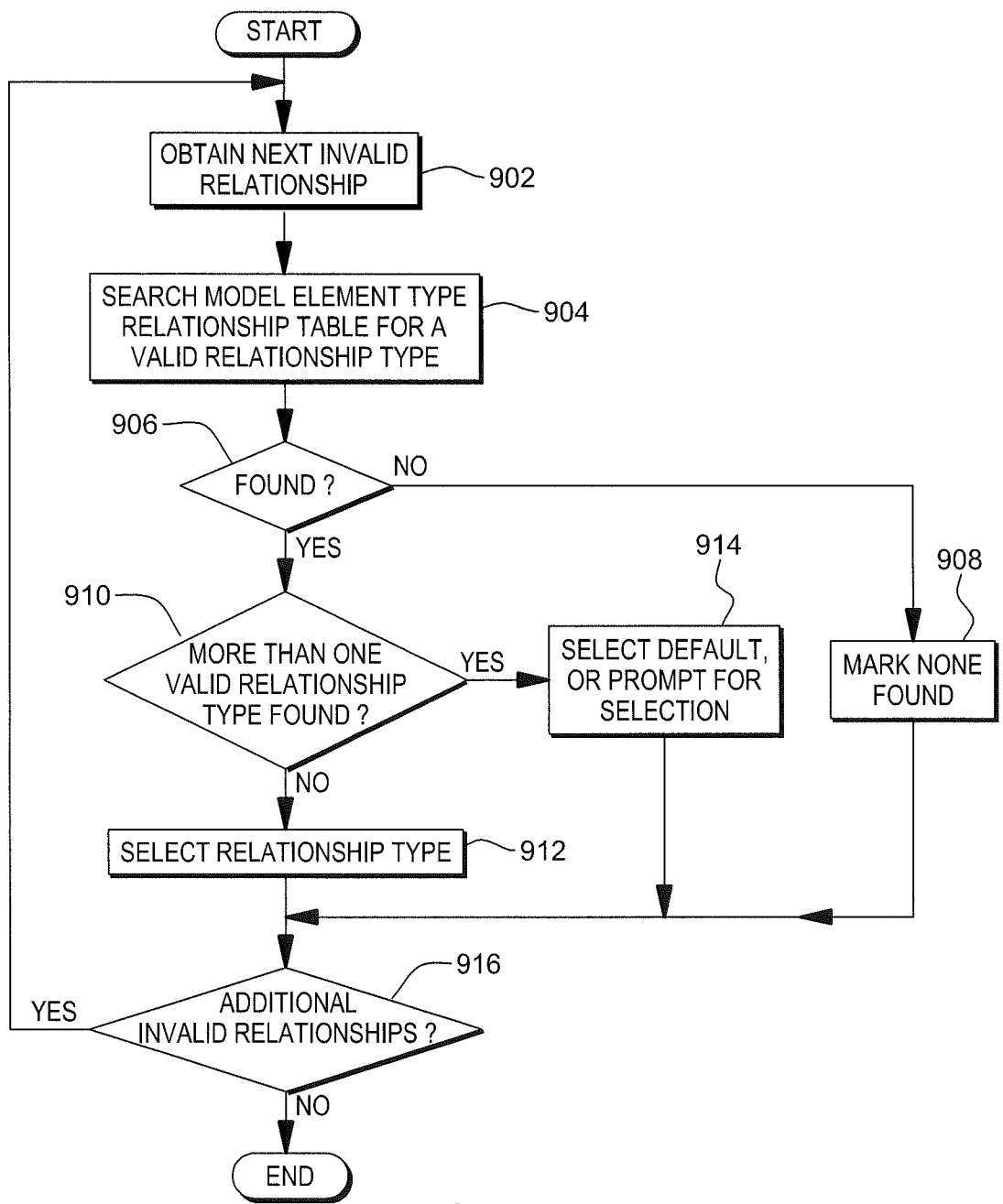
FIG. 9 depicts an example process for identifying replacement relationship types for invalid relationship types between a model element of a second model element type and model elements related to a model element of a first model element type, in accordance with one or more aspects of the present invention.

FIG. 9 depicts one example of a process for identifying replacement relationship types for the invalid relationship types between a model element of a second model element type and model elements related to a model element of a first model element type. The model elements that are related to the model element of the first model element type being migrated are identified by the process of FIG. 8, in one example.

The process begins by obtaining a next invalid relationship (902), for instance by checking a data file or database table in which the invalid relationship types are indicated. The particular second model element type and/or the related model element type may also be indicated. In any case, the process then searches the model element type relationship table for a valid relationship type, with the proper direction ("from"/"to"), as between the second model element type and the related model element type (904), and then determines whether a valid relationship type is found (906). If not found, then this is indicated (908) in, e.g., the data file or database table, or in another data file or database table. In a further embodiment, the user is notified and given the opportunity to make adjustments, for instance to correct the second model element type (to one for which a valid relationship does exist), add an entry to the table specifying a valid relationship type, etc.

If at (906) a valid relationship type is found, it is determined whether more than one valid relationship type was found (910). This would be the case where more than one type of relationship can exist between the same two model element types. If only one relationship type was found, then that relationship type is selected (912) as the replacement relationship type to use for the relationship being migrated.

If instead more than one valid relationship type is found, then the process must identify which one to use, by selection of a default or by user selection (914), as examples. The process may be configured to select a default relationship type from the candidate valid relationship types identified by (904). The default may be, for instance, the relationship type listed first out of the entries of the table that indicate a valid relationship type as between those two model elements. Alternatively, the default could follow a prioritized progression of relationship types (e.g. use Generalization (if found), otherwise Realization (if found), etc.).

In another example, the user is prompted to select which of the valid relationship types is to be used for migrating the relationship. The user could be presented with the candidate relationship types and then select one from those options.

Once the replacement relationship has been identified via the selection, the process continues by determining whether any additional invalid relationships are to be processed (916), and if so returns to (902). Otherwise, the process ends.

After performing the processes of FIGS. 8 and 9, the relationships as between the model element of the first model element type and related model elements can be properly migrated to relationships that are appropriate and valid (i.e. with the appropriate relationship type) as between the model element of the second model element type and the related model elements. Since the model element of the first model element type may be represented in one or more diagrams of the modeling environment, and since there may be relationships between that representation and representation(s) of the related model elements in those diagrams, those characteristics should also be properly migrated. For instance, those diagrammatic relationships and the graphical characteristics of the diagrammatic representation(s) of the model element of the first model element type should be preserved in the representations of the model element of the second model element type in the diagrams.

Figure 10:
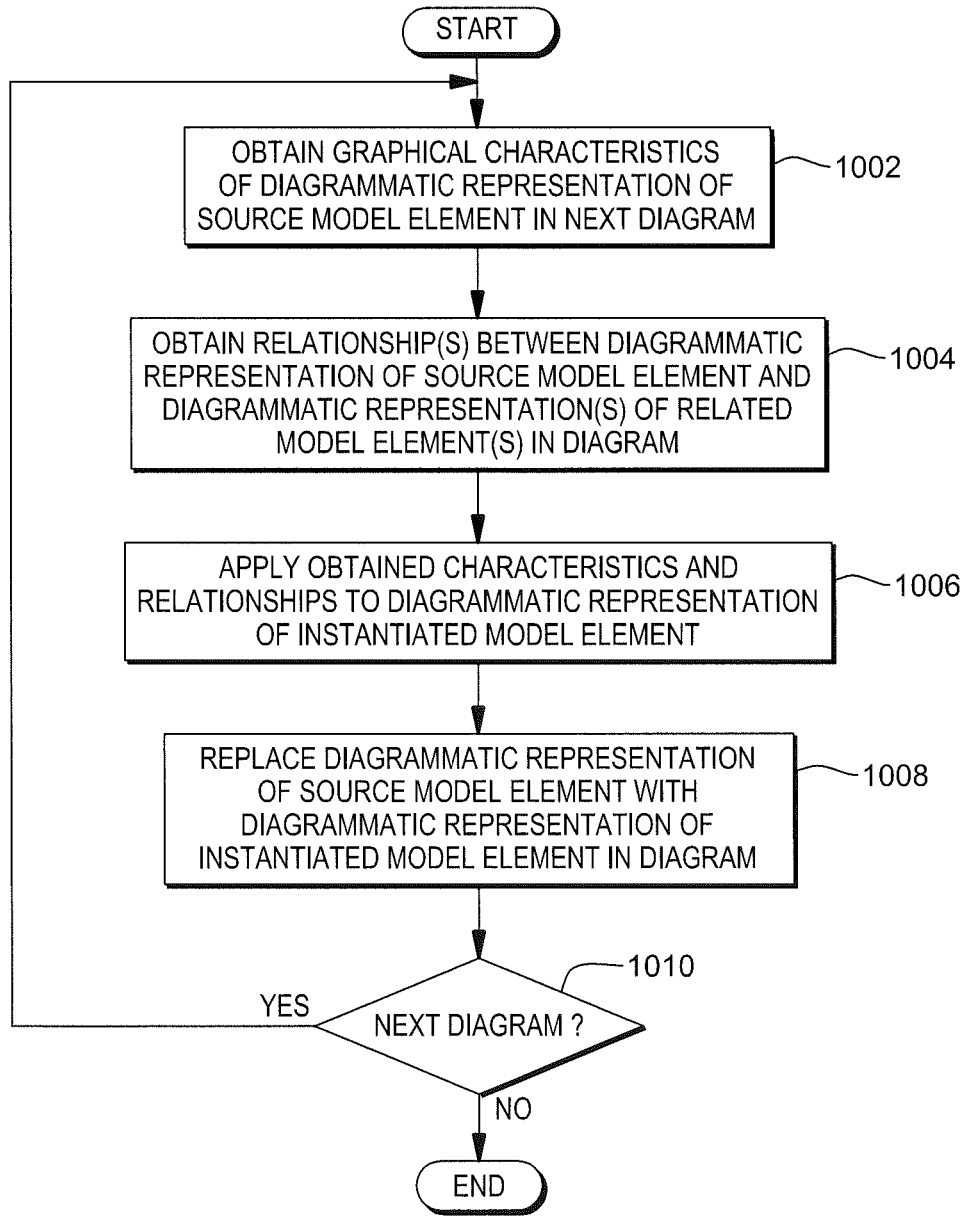
FIG. 10 depicts one example of a process for preserving properties of diagrammatic representations of a model element of a first model element type in diagrammatic representations of an instantiated model element of a second model element type, in accordance with one or more aspects of the present invention.

Accordingly, FIG. 10 depicts one example of a process for preserving properties of diagrammatic representations of a model element of a first model element type (source model element) in diagrammatic representations of a model element of a second model element type (target model element), in accordance with one or more aspects of the present invention. In the process of FIG. 10, the model element of the second model element type is a separately instantiated model element. Where, instead, the model element of the first model element type migrates into the model element of the second model element type without instantiating a separate model element for the model element of the second model element type, the process of FIG. 10 is, in one embodiment, omitted because no change is needed to these diagrammatic properties of the mode element of the first model element type (they remain as properties of the model element of the second model element type after the migration).

The process begins by obtaining graphical characteristics of a diagrammatic representation of the model element of the first model element type in a next diagram (1002). Graphical characteristics can include such items as size, shape, coordinate position, color, etc. of the diagrammatic representation. Next, any relationships that exist in that diagram between the diagrammatic representation of the model element of the first model element type and diagrammatic representations of related model elements are obtained (1004). The obtained characteristics and relationships are then applied to a diagrammatic representation of the instantiated model element (1006), which is the representation of the instantiated model element of the second model element type. In one example, the graphical characteristics are properties that can be copy and pasted to the diagrammatic representation of the model element of the second model element type, and the diagrammatic relationships are automatically programmatically changed to associate with the representation of the instantiated model element of the second model element type instead of the representation of the model element of the first model element type, as one example.

Having applied the properties to the representation of the instantiated model element of the second model element type, the process then replaces the diagrammatic representation of the model element of the first model element type in the diagram with the diagrammatic representation of the instantiated model element of the second model element type (1008). In one example, the old source model element's representation is deleted and replaced with the new target model element's representation. It is thereafter determined whether another diagram exists in which the model element of the first model element type is represented (1010). If so, the process repeats from (1002), otherwise the process ends.

Figure 11:
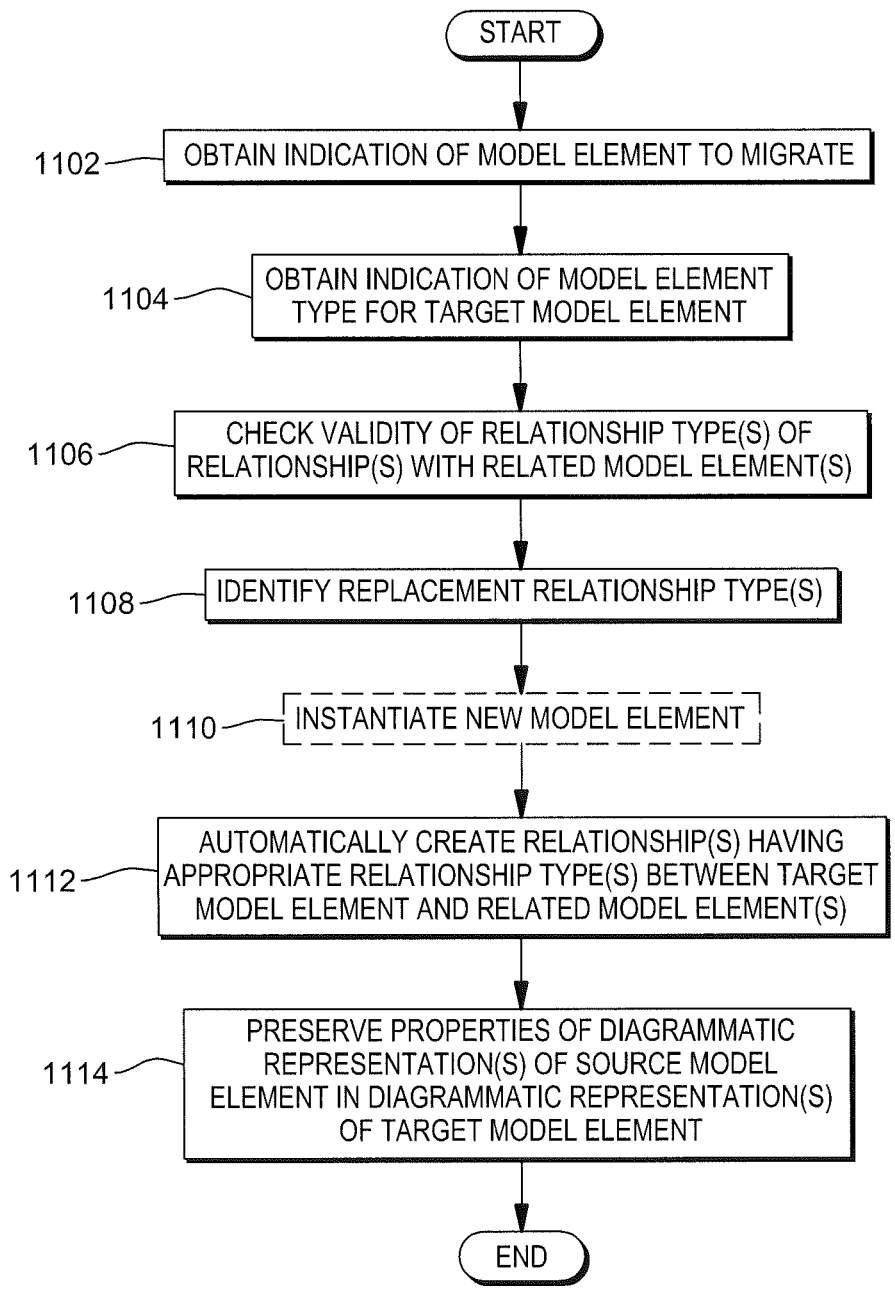
FIG. 11 depicts another example of a process for migrating a model element of a first model element type to a model element of a second model element type, in accordance with one or more aspects of the present invention.

Aspects of the above are utilized, in one example, in a process for migrating a source model element of a first model element type to a target model element of a second model element type, as depicted in FIG. 11. First, the process obtains an indication of a model element of a first model element type to migrate (1102). This is indicated based on, for instance, a selection of the model element of the first model element type by a user, or from a data file or database table referenced by the process that indicates model element(s) to migrate. Next, an indication of the second model element type (for the model element of the second model element type) is obtained (1104). In one example, this is indicated in a data file, and in another example, this is input by a user based on a prompt to input the second model element type.

Next, the process checks the validity of relationship type(s) of the relationships with the related model element(s) (1106), i.e. the validity of the types of relationships between the model element of the first model element type and related model elements, as applied to the second model element type and the related model element types. This is described above with reference to FIG. 8.

Next, the process identifies replacement relationship types (1108). This is described above with reference to FIG. 9, and identifies replacement relationship types to use for invalid relationships when migrating relationships to between the model element of the second model element type and the related model elements.

Then, optionally, a new model element is instantiated with the second model element type (1110). This is optional because, in some embodiments, a new instantiation of a model element is not necessary. For instance, in some embodiments the model element of the first model element type becomes, by way of the migration, the model element having the second model element type.

Regardless of whether a new model element is instantiated, the process continues by automatically creating relationship(s) having the appropriate relationship type(s) between the target model element of the second model element type and the related model elements (1112). In the case where a new model element is instantiated as the target model element of the second model element type, relationships having the appropriate relationship type are established as between the instantiated model element and the related model elements. Where the relationship type of the relationship between the source model element of the first model element type and a related element was determined to be valid for the migrated relationship, that relationship is applied as between the target model element of the second model element type and the related model element. Otherwise, the relationship is invalid and the relationship type identified from (1108) for that invalid relationship is used in creation of the relationship between the target model element of the second model element type and the related model element. In cases where the source model element of the first model element type is modified to become the target model element of the second model element type (they are the same model element), the relationships are already established with the related elements but (possibly) with improper relationship types, in which case they are adjusted based on the identified replacement relationship type.

By automatically creating the relationships, a manual process (e.g. by a user) to recreate these relationships between the target model element of the second model element type and the related model elements is avoided.

Finally, the properties of the diagrammatic representation(s) of the source model element of the first model element type are preserved in diagrammatic representation(s) of the target model element of the second model element type (1114). Where modification of the source model element of the first model element type migrates the source model element into the target model element of the second model element type without instantiating a new element, this preservation is, in one example, automatic in that the properties (graphical and relationship) of the diagrammatic representation(s) simply remain in place, and do not need to be copied into a diagrammatic representation of the new model element because no new diagrammatic representation is instantiated. Alternatively, where the target model element of the second model element type is a separately-instantiated model element, this preserving includes applying the obtained diagrammatic properties to the diagrammatic representation of the new model element, and replacing the diagrammatic representation of the source model element of the first model element type with the diagrammatic representation of the target model element of the second model element type. As before, this preservation is automatic, thereby avoiding a manual process by a user to apply those properties to the diagrammatic representations.

Described herein are facilities for migrating model elements to different model element types. Included are capabilities for checking validity of relationships between model element types; selecting replacement relationship types suitable for relationships between those model element types (when the original relationship would otherwise be invalid); replacing existing model elements in model diagrams with new model elements in those model diagrams; and automatically migrating model elements of first model element type(s) to model elements of second model element type(s). In a specific example, these facilities are implemented by processes performed by or within a UML-based modeling tool. A consistent and efficient (and automated, at least in part) approach is provided to change the model element type of an existing model element without affecting the integrity of the model and the diagrams that diagrammatically represent the model elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Figure 12:
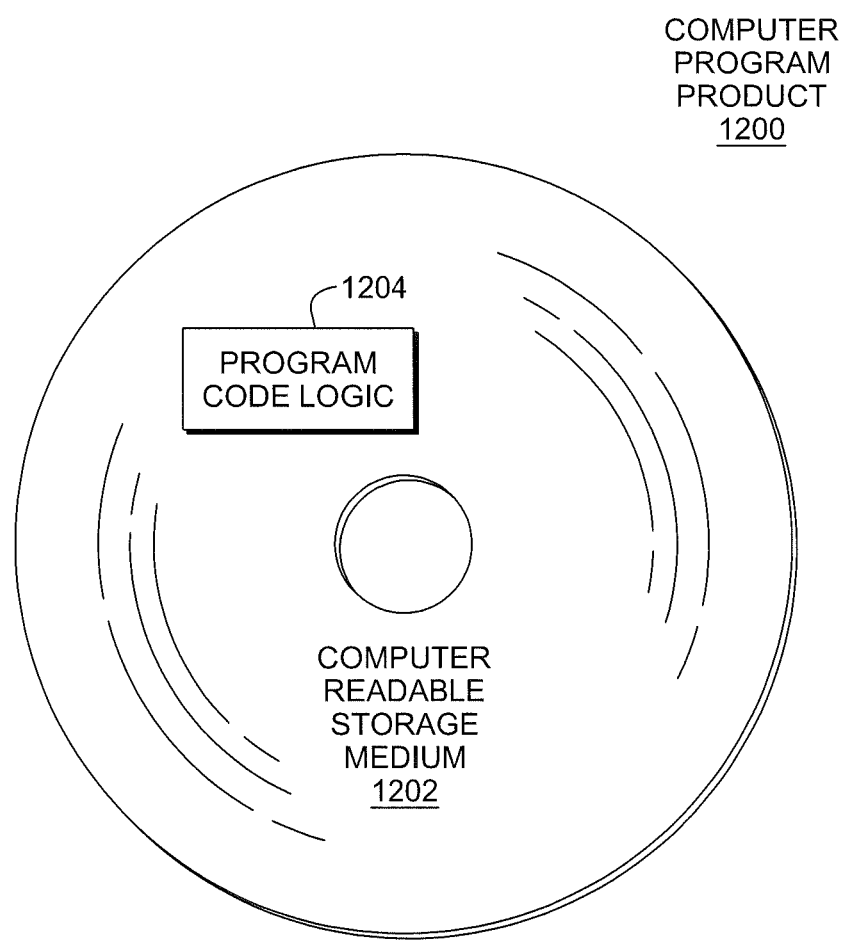
FIG. 12 depicts one embodiment of a computer program product incorporating one or more aspects of the present invention.

Referring now to FIG. 12, in one example, a computer program product 1200 includes, for instance, one or more computer readable media 1202 to store computer readable program code means or logic 1204 thereon to provide and facilitate one or more aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A method comprising:
   obtaining an indication of a first Unified Modeling Language (UML) model element of a first model element type which is to be migrated to a second UML model element of a second model element type; and
   automatically migrating the first UML model element of the first model element type to the second UML model element of the second model element type, wherein the automatically migrating migrates a relationship between the first UML model element of the first model element type and a related UML model element, of a third model element type, to a relationship between the second UML model element of the second model element type and the related UML model element, and wherein the automatically migrating comprises:
      obtaining indications of relationship types that are deemed valid or invalid as between model element types, including as between the second model element type and the third model element type, the relationship types being for relationships between UML model elements, the relationships having at least one directional property associated therewith;
      checking the relationship between the first UML model element and the related UML model element to identify a relationship type of the relationship between the first UML model element and the related UML model element; and
      checking the obtained indications to determine whether the identified relationship type of the relationship between the first UML model element and the related UML model element is indicated to be a valid relationship type that may exist as between the second UML model element of the second model element type and the related UML model element of the third model element type, wherein the checking obtained indications checks one or more data structures comprising the indications and determines that the identified relationship type is an invalid type of relationship as between the second model element type and the third model element type; and
      based on determining that the identified relationship type is an invalid type of relationship as between the second model element type and the third model element type, identifying a replacement relationship type that is indicated to be a valid type of relationship that may exist as between the second model element type and the third model element type, wherein migrating the relationship between the first UML model element of the first model element type and the related UML model element to the relationship between the second UML model element of the second model element type and the related UML model element applies the identified replacement relationship type to the relationship between the second UML model element of the second model element type and the related UML model element.

2. The method of claim 1, wherein the first model element type is different from the second model element type, and wherein the third model element type is a same model element type as the first model element type or the second model element type, or is different from both the first model element type and the second model element type.

3. The method of claim 1, wherein the indications indicate relationship types considered to be valid as between model element types, relationship types considered to be invalid as between model element types, or both relationship types considered to be valid as between model element types and relationship types considered to be invalid as between model element types.

4. The method of claim 1, wherein identifying the replacement relationship type comprises:
   searching at least one data structure of the one or more data structures for a valid relationship type that may exist as between the second model element type and the third model element type; and
   based on the searching identifying at least one valid relationship type that may exist as between the second model element type and the third model element type, selecting the replacement relationship type from the identified at least one valid relationship type that may exist as between the second model element type and the third model element type.

5. The method of claim 1, wherein a diagrammatic representation of the first UML model element of the first model element type is present in a diagram of a modeling environment, wherein the diagrammatic representation of the first UML model element of the first model element type comprises one or more properties, and wherein the automatically migrating further comprises preserving the one or more properties of the diagrammatic representation of the first UML model element of the first model element type in a diagrammatic representation of the second UML model element of the second model element type.

6. The method of claim 5, wherein the one or more properties include one or more graphical characteristics of the diagrammatic representation of the first UML model element of the first model element type.

7. The method of claim 1, wherein the automatically migrating migrates multiple additional relationships between the first UML model element of the first model element type and additional related UML model elements to multiple relationships between the second UML model element of the second model element type and the additional related UML model elements, wherein the method further comprises repeating, for each of the multiple additional relationships between the first UML model element of the first model element type and the additional related UML model elements, the checking the relationship between the first UML model element and the additional related UML model element and the checking the obtained indication to determine whether the identified relationship type is indicated to be a valid type of relationship that may exist as between the second UML model element of the second model element type and the additional related UML model element, wherein:
  based on the checking determining that the relationship is indicated to be a valid type of relationship that may exist as between the second UML model element and the additional related UML model element, the automatically migrating automatically creates, with the relationship type, a relationship between the second UML model element of the second model element type and the additional related UML model element; and
  based on the checking determining that the relationship is indicated to be an invalid type of relationship as between the second UML model element and the additional related UML model element, the method further comprises identifying a replacement relationship type that is indicated to be a valid relationship type that may exist as between the second UML model element and the additional related UML model element, wherein the automatically migrating automatically creates, with the identified replacement relationship type, a relationship between the second UML model element and the additional related UML model element.

8. A computer system comprising:
a memory; and
a processor in communication with the memory, wherein the computer system is configured to perform:
  obtaining an indication of a first Unified Modeling Language (UML) model element of a first model element type which is to be migrated to a second UML model element of a second model element type; and
  automatically migrating the first UML model element of the first model element type to the second UML model element of the second model element type, wherein the automatically migrating migrates a relationship between the first UML model element of the first model element type and a related UML model element, of a third model element type, to a relationship between the second UML model element of the second model element type and the related UML model element, and wherein the automatically migrating comprises:
    obtaining indications of relationship types that are deemed valid or invalid as between model element types, including as between the second model element type and the third model element type, the relationship types being for relationships between UML model elements, the relationships having at least one directional property associated therewith;
    checking the relationship between the first UML model element and the related UML model element to identify a relationship type of the relationship between the first UML model element and the related UML model element; and
    checking the obtained indications to determine whether the identified relationship type of the relationship between the first UML model element and the related UML model element is indicated to be a valid relationship type that may exist as between the second UML model element of the second model element type and the related UML model element of the third model element type, wherein the checking the obtained indications checks one or more data structures comprising the indications and determines that the identified relationship type is an invalid type of relationship as between the second model element type and the third model element type; and
    based on determining that the identified relationship type is an invalid type of relationship as between the second model element type and the third model element type, identifying a replacement relationship type that is indicated to be a valid type of relationship that may exist as between the second model element type and the third model element type, wherein migrating the relationship between the first UML model element of the first model element type and the related UML model element to the relationship between the second UML model element of the second model element type and the related UML model element applies the identified replacement relationship type to the relationship between the second UML model element of the second model element type and the related UML model element.

9. The computer system of claim 8, wherein the first model element type is different from the second model element type, and wherein the third model element type is a same model element type as the first model element type or the second model element type, or is different from both the first model element type and the second model element type.

10. The computer system of claim 8, wherein the indications indicate relationship types considered to be valid as between model element types, relationship types considered to be invalid as between model element types, or both relationship types considered to be valid as between model element types and relationship types considered to be invalid as between model element types.

11. The computer system of claim 8, wherein identifying the replacement relationship type comprises:
  searching at least one data structure of the one or more data structures for a valid relationship type that may exist as between the second model element type and the third model element type; and based on the searching identifying at least one valid relationship type that may exist as between the second model element type and the third model element type, selecting the replacement relationship type from the identified at least one valid relationship type that may exist as between the second model element type and the third model element type.

12. The computer system of claim 8, wherein a diagrammatic representation of the first UML model element of the first model element type is present in a diagram of a modeling environment, wherein the diagrammatic representation of the first UML model element of the first model element type comprises one or more properties, and wherein the automatically migrating further comprises preserving the one or more properties of the diagrammatic representation of the first UML model element of the first model element type in a diagrammatic representation of the second UML model element of the second model element type.

13. A computer program product comprising:
a non-transitory computer-readable storage medium readable by a processor and storing instructions for execution by the processor to perform a method comprising:
obtaining an indication of a first Unified Modeling Language (UML) model element of a first model element type which is to be migrated to a second UML model element of a second model element type; and automatically migrating the first UML model element of the first model element type to the second UML model element of the second model element type, wherein the automatically migrating migrates a relationship between the first UML model element of the first model element type and a related UML model element, of a third model element type, to a relationship between the second UML model element of the second model element type and the related UML model element, and wherein the automatically migrating comprises:
obtaining indications of relationship types that are deemed valid or invalid as between model element types, including as between the second model element type and the third model element type, the relationship types being for relationships between UML model elements, the relationships having at least one directional property associated therewith;
checking the relationship between the first UML model element and the related UML model element to identify a relationship type of the relationship between the first UML model element and the related UML model element; and
checking the obtained indications to determine whether the identified relationship type of the relationship between the first UML model element and the related UML model element is indicated to be a valid relationship type that may exist as between the second UML model element of the second model element type and the related UML model element of the third model element type, wherein the checking the obtained indications checks one or more data structures comprising the indications and determines that the identified relationship type is an invalid type of relationship as between the second model element type and the third model element type; and based on determining that the identified relationship type is an invalid type of relationship as between the second model element type and the third model element type, identifying a replacement relationship type that is indicated to be a valid type of relationship that may exist as between the second model element type and the third model element type, wherein migrating the relationship between the first UML model element of the first model element type and the related UML model element to the relationship between the second UML model element of the second model element type and the related UML model element applies the identified replacement relationship type to the relationship between the second UML model element of the second model element type and the related UML model element.

14. The computer program product of claim 13, wherein the first model element type is different from the second model element type, and wherein the third model element type is a same model element type as the first model element type or the second model element type, or is different from both the first model element type and the second model element type.

15. The computer program product of claim 13, wherein the indications indicate relationship types considered to be valid as between model element types, relationship types considered to be invalid as between model element types, or both relationship types considered to be valid as between model element types and relationship types considered to be invalid as between model element types.

16. The computer program product of claim 13, wherein identifying the replacement relationship type comprises:
searching at least one data structure of the one or more data structures for a valid relationship type that may exist as between the second model element type and the third model element type; and
based on the searching identifying at least one valid relationship type that may exist as between the second model element type and the third model element type, selecting the replacement relationship type from the identified at least one valid relationship type that may exist as between the second model element type and the third model element type.

* * * * *